Patented Aug. 30, 1927.

1,641,013

UNITED STATES PATENT OFFICE.

HEINRICH SCHNEIDER AND FRANZ RAHN, OF NIEDER-JNGELHEIM-ON-THE-RHINE, GERMANY, ASSIGNORS TO THE FIRM: C. H. BOEHRINGER SOHN, CHEMISCHE FABRIK, OF NIEDER-JNGELHEIM-ON-THE-RHINE, GERMANY, A COMPANY OF GERMANY.

BAKING POWDER.

No Drawing. Application filed September 1, 1925, Serial No. 53,938, and in Germany May 30, 1925.

In known baking powders consisting of tartar and bicarbonate, two-thirds of the total raising capacity, known as the anterior raising capacity, is effective in the cold, and the remaining one-third of the total raising capacity, known as the posterior raising capacity, becomes effective when the powder is heated. Such baking powders have, with respect to the distribution of their raising capacity, been regarded as satisfactory, and in the production of baking powders from other materials, such as bicarbonate with acid phosphate) calcium lactate and acid calcium lactate, it has been heretofore attempted to adjust the raising capacity to correspond to that of known tartar-bicarbonate baking powder.

The present invention is based upon the perception that the considerable anterior raising, which was heretofore thought to be indispensible, is not required, but that, on the contrary, excellent results may be achieved by using materials the anterior fermentative or raising effect of which is by far inferior to that of tartar and may be, for instance, considerably smaller than one-half of the total raising capacity, e. g., only about one-fourth to approximately one-third of the latter.

According to the invention, good results are obtained, e. g., by using neutral calcium tartrate as an acid constituent for baking powders, although the application of this material produces an anterior raising amounting to only about one-fourth of the total raising capacity. The use of calcium tartrate has especially proved to be advantageous when large quantities of dough were to be worked up, for the preparation of which a fairly long time is required from the first dressing of the mass up to its being brought into the oven. The applicability of neutral calcium tartate as an acid constituent of baking powders is surprising, in so far as the salt in question is only sparingly soluble. The action of calcium tartrate might rather have been expected to bear a resemblance to that of secondary calcium phosphate, which is likewise difficult to dissolve and is known to be unavailable as an acid constituent to be used by itself.

According to one form of my invention, neutral calcium tartrate is made use of in combination with additions of other substances having a fermentative or raising effect, e. g., with easily soluble neutral salts of inorganic or organic acids, such as calcium lactate, calcium formate ($CaC_2H_2O_4$), calcium acetate ($CaC_4H_6O_4$), or else with baking powder ingredients of an acid nature, as, e. g., tartaric acid, tartar, bilactate, acid phosphate, or substances of both kinds. By such measures it is possible, on the one hand, to increase the anterior raising of the calcium tartrate, which only amounts to one-fourth of the total raising power and consequently touches about the lowest limit admissible, to, e. g., about one-third of the total raising power; and, on the other hand, to improve the posterior raising capacity with respect to uniformity in the development of carbon dioxide, so that such inconveniences as the formation of swellings in the pastry will be avoided even if the process of baking is carried out rather carelessly. In general, comparatively small amounts of such additions have been found to be surprisingly effective. Under no condition will there be required such quantities as might produce any essential change in the main acid components.

When using additions of the said kind, it is furthermore possible to use, besides the sparingly soluble calcium tartate, also other sparingly soluble salts, as, e. g., the above-mentioned secondary calcium phosphate, which in itself is not available as an acid constituent, on the one hand because its anterior raising is too small, and on the other hand because, when heated, it gives a spontaneous production of carbonic acid, causing the baked wares to puff up. A baking powder of excellent efficiency will be obtained, for instance, by distributing the raising capacity approximately equally between the calcium tartrate, secondary calcium phosphate and calcium lactate. Such a baking powder may, for example, be composed as follows.

48 parts of neutral calcium tartrate ($CaC_4H_4O_6$).

61.2 parts of neutral calcium lactate ($CaC_6H_{10}O_6$).

51.5 parts of secondary calcium phosphate.

83.5 parts of sodium bicarbonate.

As indicated by the above example, the invention provides baking powders completely composed of neutral non-hydroscopic salts, which have, for this reason, excellent keeping qualities.

The proportions of the acid ingredients should, preferably, be chosen in such a way that the total amount of the anterior raising will not considerably exceed two-thirds of the total raising capacity and preferably will fall within the range of one-fourth to one-half of the total raising capacity of the baking powder.

As baking tests have shown, the use of a baking powder prepared, e. g., after the above-mentioned recipe, produces a much greater height of the baked goods than that obtained by means of the pure tartar baking powders hitherto considered as ideal. Further trials with the new baking powder in question have furnished proof that even if the raising is effected with only two-thirds of the amount of carbonic acid normally supplied in the use of tartar baking powders, one will nevertheless obtain baked goods which, with respect to their height as well as their interior structure, are entirely equivalent to those made by means of tartar baking powders. This result indicates that baking powders with a reduced anterior raising capacity will work more rationally than the baking powders with a high anterior raising capacity, heretofore used.

Instead of, or in addition to, calcium tartrate, there may also be used other neutral calcium salts of acids which in themselves can be taken into consideration for baking purposes, i. e., which are neither harmful to the baked articles nor to the human or the animal organism. There should preferably be used sparingly soluble neutral calcium salts, e. g., salts of oxycarbonic acids, for instance, saccharic acid, mucic acid, etc.

We claim:

1. Baking powder comprising a bicarbonate and neutral calcium tartrate.

2. Baking powder comprising a bicarbonate, a neutral sparingly soluble salt capable of reacting with the bicarbonate to liberate carbon dioxide and a material having the effect of increasing the anterior raising power and decreasing the posterior raising power of the said sparingly soluble salt.

3. Baking powder comprising a bicarbonate, neutral calcium tartrate and a material having the effect of increasing the anterior raising power and decreasing the posterior raising power of the calcium tartrate.

4. Baking powder comprising a bicarbonate, neutral calcium tartrate and another neutral salt having raising properties 5. Baking powder comprising a bicarbonate, neutral calcium tartrate and a neutral readily soluble calcium salt.

6. Baking powder comprising a bicarbonate, neutral calcium tartrate and another sparingly soluble calcium salt having raising properties.

7. Baking powder comprising a bicarbonate, neutral calcium tartrate and calcium lactate.

8. Baking powder comprising a bicarbonate, neutral calcium tartrate and secondary calcium phosphate.

9. Baking powder comprising a bicarbonate, neutral calcium tartrate, calcium lactate and secondary calcium phosphate.

In testimony whereof we affix our signatures.

Dr. HEINRICH SCHNEIDER.
Dr. FRANZ RAHN.